United States Patent Office 3,311,640
Patented Mar. 28, 1967

3,311,640
11-(2-PROPYNYL)-2-(PROPYNYLOXY)-2-PROPYNYL ESTER OF 11H - BENZO(a)CARBAZOLE - 3 - CARBOXYLIC ACID
Chester E. Pawloski, Bay City, Mich., assignor to The Dow Chemical Company, Midland, Mich., a corporation of Delaware
No Drawing. Filed Dec. 26, 1963, Ser. No. 333,661
1 Claim. (Cl. 260—315)

The present invention is directed to a compound corresponding to the formula

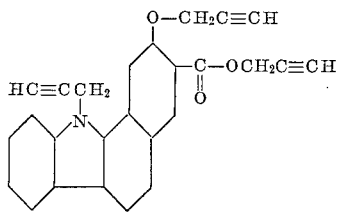

This compound is a crystalline solid which is somewhat soluble in many organic solvents and of low solubility in water. The compound has been found to be useful as a pesticide for the control of various insect, mite, worm, bacterial and fungal organisms such as roundworms, beetles, roaches, mites and bacteria.

The new compound can be prepared by reacting 2-hydroxybenzo(a)carbazole-3-carboxylic acid with a propargyl halide such as propargyl bromide or propargyl chloride. The reaction is carried out in the presence of a basic material and preferably in a liquid reaction media such as isopropanol, acetone or methyl ethyl ketone. The reaction takes place smoothly at temperatures at which halide of reaction is formed and preferably from about 0 to 100° C. The halide of reaction appears in the reaction mixture as the salt of the metal moiety of the employed base. The amounts of the reactants to be employed are not critical, some of the desired product being obtained when employing the reactants in any amounts. However, the reaction consumes the reactants in molecular proportions of three moles each of the propargyl halide and the basic material for every mole of benzocarbazole and the use of amounts which represent such proportions is preferred. Upon completion of the reaction, the desired product may be separated and purified by conventional procedures.

In carrying out the reaction, the propargyl halide, benzocarbazole and basic material, such as an alkali metal carbonate are combined in any convenient fashion. In a preferable procedure, the reactants are dispersed in an organic solvent as reaction medium. The resulting mixture is maintained in the aforestated temperature range until there is a substantial cessation in the production of the halide of reaction. The product can be separated from the halide of reaction by such conventional procedures as filtration of the warm reaction mixture, washing the reaction mixture with water or extraction of the product with a common organic solvent. The desired product can then be obtained by heating the filtrate, the organic layer obtained in the washing procedure or the extraction solution to remove the low boiling materials. The product thus obtained can be employed as the toxic constituent in pesticidal applications or further purified by such operations as washing with water or recrystallization from common organic solvents.

In a representative operation, 2-hydroxybenzo(a)carbazole-3-carboxylic acid (13 grams), propargyl bromide (19 grams) and potassium carbonate (22 grams) were dispersed in 200 milliliters of acetone and the resulting mixture heated at the boiling temperature and under reflux for 32 hours. The hot reaction mixture was thereafter filtered to remove the potassium bromide by-product. The filtrate thus obtained was heated to remove the low boiling constituents and obtain the 11-(2-propynyl)-2-(2-propynyloxy)-2-propynyl ester of 11H-benzo(a)carbazole-3-carboxylic acid product as a liquid residue. Upon cooling, the liquid residue solidified to form a crystalline product which melted at 98–100° C.

The novel product of the present invention is useful as the toxic constituent in pesticidal applications for the control of the growth and the killing of a number of insect, mite, worm, bacterial and fungal organisms. For such uses, the product can be dispersed on an inert finely divided solid and employed as a dust. Such mixtures may also be dispersed in water with or without the aid of a surface active agent and the resulting aqueous suspensions employed as sprays. In other procedures, the product is employed as the active constituent in solvent solutions, oil-in-water or water-in-oil emulsions or aqueous dispersions. In representative operations, excellent controls and kills of root-knot nematodes are obtained when 11-(2-propynyl)-2-(2-propynyloxy)-2-propynyl ester of 11H-benzo(a)carbazole-3-carboxylic acid is employed in aqueous compositions at concentrations of 10 parts per million by weight.

I claim:
11-(2-propynyl)-2-(2-propynyloxy)-2-propynyl ester of 11H-benzo(a)carbazole-3-carboxylic acid.

References Cited by the Examiner
FOREIGN PATENTS
367,597   2/1932   Great Britain.
369,453   3/1932   Great Britain.

JOHN D. RANDOLPH, Primary Examiner.
JOHN M. FORD, Assistant Examiner.